Sept. 11, 1956 E. V. GILBERT 2,762,995
AUTOMOBILE IMPACT INDICATOR
Filed Feb. 3, 1954 2 Sheets-Sheet 1
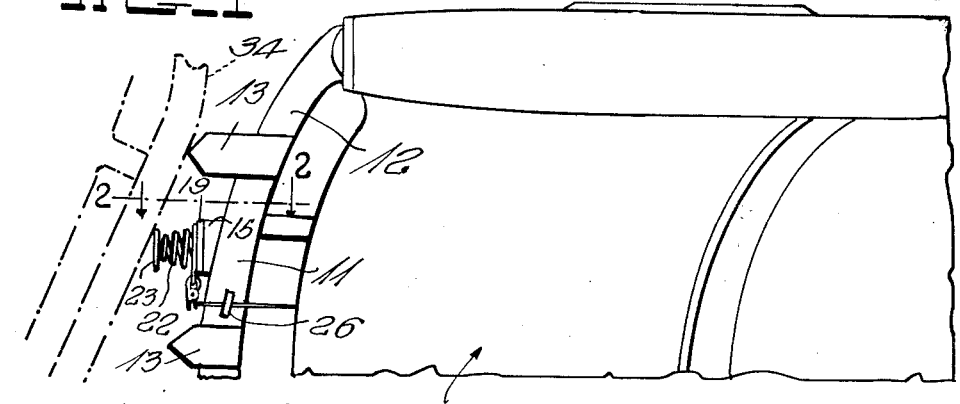
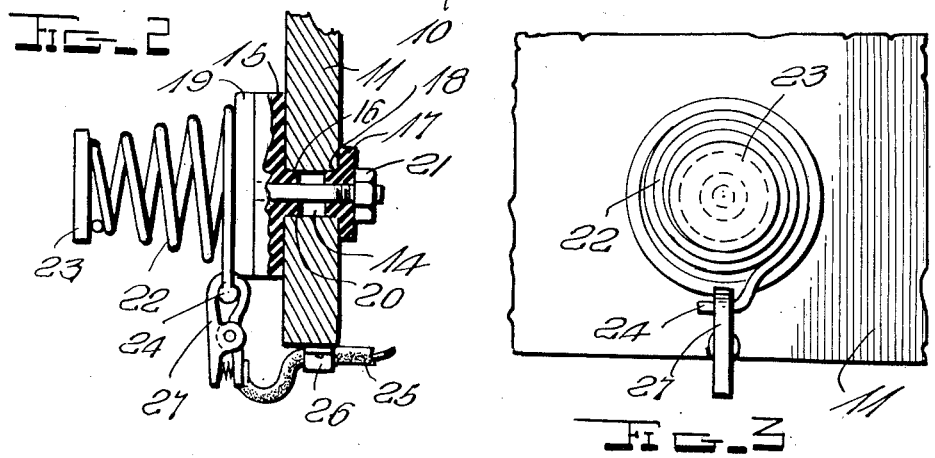
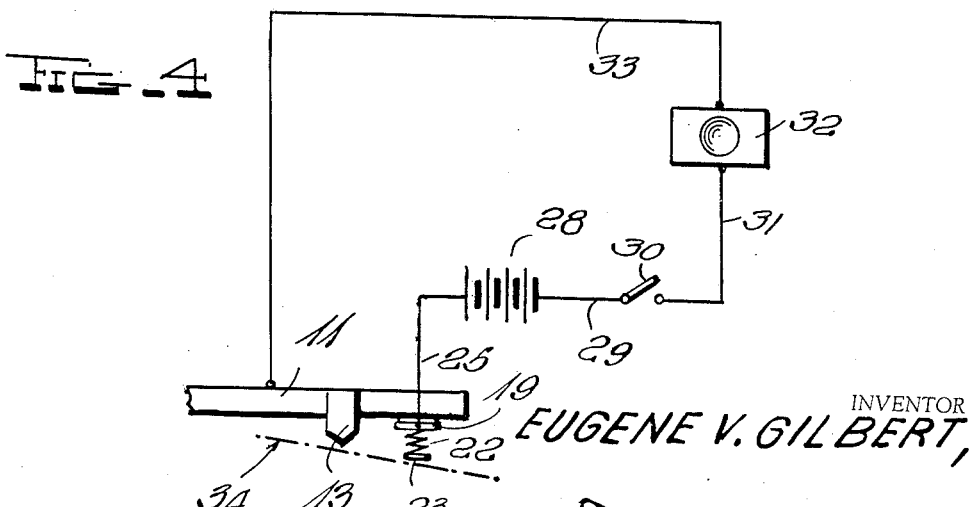
INVENTOR
EUGENE V. GILBERT,
BY
ATTORNEY Sept. 11, 1956    E. V. GILBERT    2,762,995
AUTOMOBILE IMPACT INDICATOR
Filed Feb. 3, 1954    2 Sheets-Sheet 2
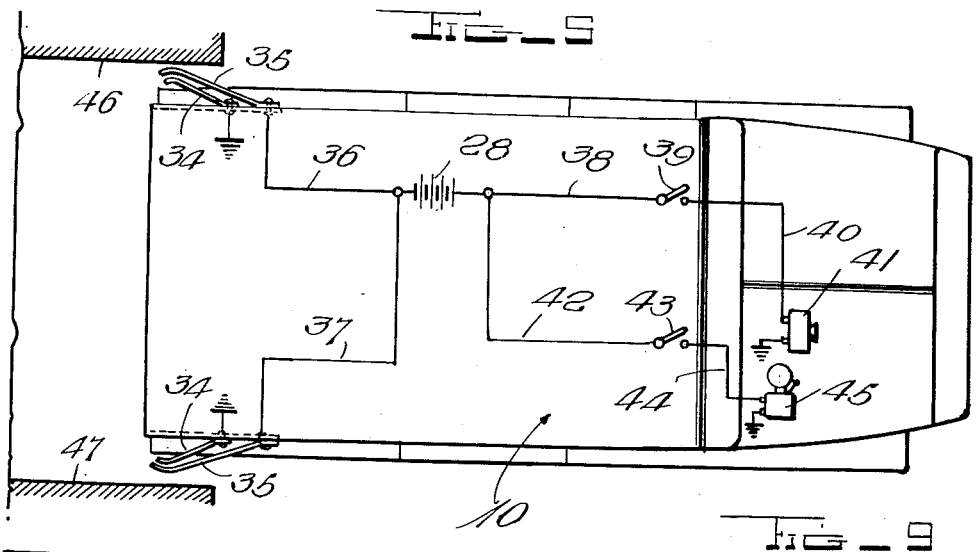
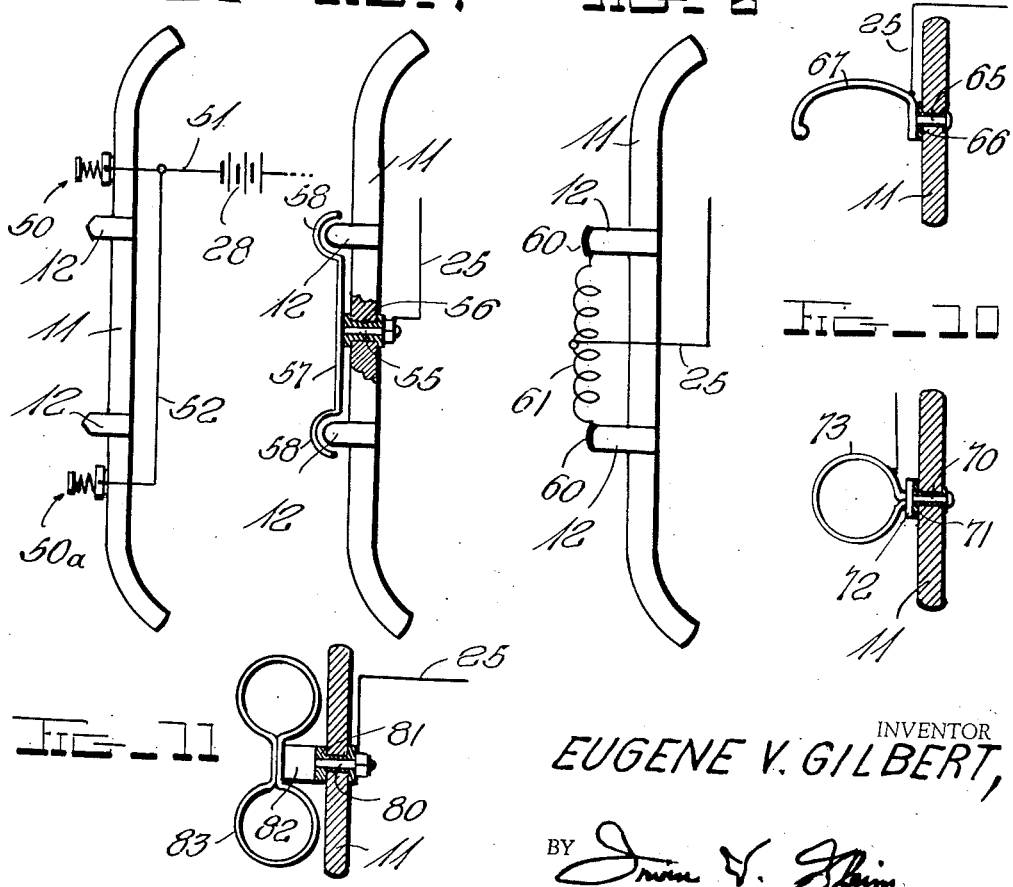
INVENTOR
*EUGENE V. GILBERT,*
BY
ATTORNEY

United States Patent Office 2,762,995
Patented Sept. 11, 1956

2,762,995
AUTOMOBILE IMPACT INDICATOR

Eugene V. Gilbert, Miamisburg, Ohio, assignor of one-half to Adolph Bednarz, Miamisburg, Ohio Application February 3, 1954, Serial No. 407,844

2 Claims. (Cl. 340—61)

The present invention relates to yieldable automobile collision indicators and it consists in the combinations, constructions and arrangements of parts herein described and claimed.

Generally there is provided a switch which is adaptable for attachment to an exterior surface, as, for example, the bumper or sides of an automotive vehicle and which is further adapted to complete an electrical circuit which includes the battery of the vehicle and a signalling device such as a horn, buzzer or the like. Various forms of the invention are illustrated and described in the annexed specification all of which possess one common feature, namely, their yieldability and their utilization of the body of the vehicle as a part of the aforesaid electrical circuit.

It is accordingly an object of the invention to provide devices of the character set forth which are simple in construction, inexpensive to manufacture and yet effective and efficient in use.

Another object of the invention is to provide devices of the character set forth which are capable of quick and easy attachment to or detachment from an automotive vehicle.

Another object of the invention is the provision, in devices of the character set forth, of novel means for completing an electrical circuit including an alarm device.

Another object of the invention is to provide novel yieldable switch mechanisms forming parts of the invention.

Other and further objects of the invention will become apparent from a reading of the following specification taken in conjunction with the drawings, in which:

Figure 1 is a side elevational view, partly broken away, of an embodiment of the invention shown attached to the bumper of an automobile.

Figure 2 is an enlarged fragmentary sectional view, partly broken away, taken along line 2—2 of Figure 1.

Figure 3 is a front elevational view of Figure 2,

Figure 4 is a schematic view illustrating the electrical circuit involved,

Figure 5 is a plan view, partly schematic, of a modified form of the invention,

Figures 6 to 8, inclusive, are fragmentary plan views illustrating further modifications of the invention, and Figures 9 to 11, inclusive, are fragmentary vertical sectional views illustrating still further modifications of the invention.

Referring more particularly to the drawings, there is shown therein, in Figures 1 to 4, inclusive, an automobile generally designated at 10 and provided with a bumper 11 having vertically extending bumper guards 12 from each of which there extends forwardly grille members 13.

An opening 14 is centrally provided in the bumper 11 and a circular plate 15 of rubber or like dielectric material abuts the forward face of the bumper 11 and is provided with an aligning collar 16 which extends into the opening 14. A rear plate 17, likewise of dielectric material abuts the rear face of the bumper 11 and is provided with a forwardly extending aligning collar 18 which extends into the opening 14.

A metallic cap 19 is mounted upon the other end of the plate 15 and is centrally provided with a rearwardly extending bolt 20 which extends through the plates 15 and 17, their aligning collars 16 and 18 and, of course, through the opening 14 and is provided at its rearward end with a nut 21.

Affixed to the outer face of the cap 19 is the base portion of a helical spring 22 whose outer end has affixed thereto a cap 23. The inner end of the spring 22 terminates in a dependent portion 24. A wire 25, suitably insulated, is attached to the bumper 11 by means of a bracket 26 and terminates at its outer end in a fixed contact, as for example, clip contact 27 which may be removably engaged with the dependent portion 24 of the spring 22.

The other end of the wire 25 is connected to the battery 28 of the vehicle in which the device is mounted and the battery 28 is, in turn, connected by a wire 29 to a manual switch 30 positioned at any convenient place in the vehicle as, for example, upon the instrument panel thereof. The switch 30 is connected by a wire 31 with a signalling device 32 which may be a bell, horn, buzzer, visual signal or the like. The signalling device 32 is connected by a wire 33 to the body of the vehicle.

In operation, it will be apparent that the switch 30 is first closed and thereafter the clip contact 27 is affixed to the dependent portion 24 of the spring 22 after which the device is in operative condition. If, thereafter, the cap 23 comes into contact with, for example, another vehicle indicated in dotted lines at 34, for example, and the vehicle 34 further comes into contact with any part of the body of the vehicle to which the instant device is attached, as, for example, the member 13 as illustrated in Figure 1, then an electrical circuit will be completed which includes the cap 23, the spring 22, the clip 27, the wire 25, the battery 28, the wire 29, switch 30, the wire 31, the signalling device 32, the wire 33 and the body of the vehicle in which the device is mounted, the member 13, the body of the vehicle contacted by the present device and finally back to the cap 23. Upon such completion of a circuit as just described, it will be apparent that the signalling device 32 will indicate to the driver of the vehicle in which the instant device is mounted that his vehicle has come into contact with another vehicle.

In the form of the invention illustrated in Figure 5, it will be seen that the vehicle 10 is provided with an outwardly and rearwardly extending fixed arm 34 upon either side thereof and adjacent the rear end of such vehicle. It will also be noted that the outer end portion of each of the arms 34 extends beyond the greatest width of the vehicle 10 at that particular point. Fastened to the vehicle 10 immediately forwardly of each of the fixed arms 34 is a rearwardly and outwardly extending yieldable arm 35. It will be noted that the outer end portion of each of the flexible arms 35 is spaced immediately outwardly of the outer portion of its associated arm 34.

The arms 34 are grounded upon the body 10 while the arms 35 are respectively connected by wires 36 and 37 with a battery 28. A wire 38 connects the battery 28 with a manually operable switch 39 which is, in turn, connected by a wire 40 to a buzzer signal 41 which is electrically grounded upon the body 10. A wire 42 interconnects the wire 38 at a point adjacent the battery 28 and a manually operable switch 43 which is, in turn, connected by a wire 44 to a bell alarm 45 which is also grounded upon the body 10.

In the operation of this form of the invention, it will be apparent that by closing the switch 39 and allowing the switch 43 to remain open, inward pressure upon either of the arms 35 will complete an electrical circuit to the buzzer 41 while if the switch 39 is allowed to remain open and the switch 43 is closed, inward movement of the arm 35 in either case will cause the bell arm 45 to sound. Thus in both cases there will be indicated to the operator of the vehicle 10 the fact that the rearward portion of his car is becoming dangerously close to another object as, for example, either of the walls 46 or 47.

In the form of the invention illustrated in Figure 6, there is mounted upon the bumper 11 two of the units shown in detail in Figures 1 to 3, inclusive, and each now generally designated at 50 and 50a. It will be seen that the unit 50 is connected by a wire 51 to the battery 28 while the unit 50a is connected by a wire 52 to the wire 51.

The operation of the form of the invention illustrated in Figure 6 is identical with that described with regard to the form illustrated in Figures 1 to 4, inclusive, with the exception that either of the units 50 or 50a will cause an alarm to be given either visually or by sound.

In the form of the invention illustrated in Figure 7, a bolt 55 extends centrally through the bumper 11 and is provided with suitable insulation 56 to keep it from electrical contact with the bumper. A transverse bar 57 of yieldable material is affixed to the outer end of the bolt 55 and is provided with curvular end portions 58. The curvular portions 58 are so positioned as to immediately overlie the forward faces of the bumper guards 12.

In the operation of this form of the invention, it will be apparent that when another object such as another automobile or the like is contacted by either side of the bar 57, that the curvular portion 58 upon that side thereof will be forced into contact with its associated bumper guard 12 thus completing an electrical circuit, in the manner heretofore described with regard to the form of the invention illustrated in Figures 1 to 4, inclusive.

In the form of the invention illustrated in Figure 8 there is affixed to the outer face of each of the guards 12 a plate 60 of dielectric material and a coil spring 61 interconnects the plate 60.

In the operation of this form of the invention, it will be apparent that whenever the spring 60 comes into contact with a metallic object such as the bumper of another vehicle and such other bumper also contacts the bumper 11 of the vehicle in which the device is installed that a signal will be given in the manner heretofore described with regard to the device illustrated in Figures 1 to 4, inclusive.

In the form of the invention illustrated in Figure 9, a bolt 65 extends through the bumper 11 and is suitably insulated therefrom, as indicated at 66. The outer end of the bolt 65 has affixed thereto the rearward end of an inverted U-shaped arm 67 of yieldable material.

In the operation of this form of the invention, it will be apparent that if an object is encountered by the outer end of the arm 67, the latter will be forced rearwardly until it makes contact with the outer face of the bumper 11 thus completing an electrical circuit as heretofore described with Figures 1 to 4, inclusive, and with the same signalling results.

In the form of the invention shown in Figure 10, a bolt 70 extends through the bumper 11 and is suitably insulated therefrom, as indicated at 71 and has affixed to the outer end thereof a metallic plate 72 to which, in turn, is affixed a ring 73 of yieldable metal which ring extends in a vertical plane.

In the operation of this form of the invention, it will be apparent that when the ring 73 comes into contact with, for example, another vehicle, that the same will be distorted until a portion of such ring 73 comes into contact with the outer face of the bumper 11 thus again completing a circuit as heretofore described.

In the form of the invention illustrated in Figure 11, a bolt 80 extends through the bumper 11 and is suitably insulated therefrom, as indicated at 81 and has affixed at its outer end a block 82 which, in turn, has affixed to its outer end a double ring 83 in the general form of a figure "8" and lying in a vertical plane.

In the operation of this last-named form of the invention, it will be apparent that whenever either of the ring portions of the double ring member 83 come into contact with another object such as another vehicle, that the same will be forced toward and will make contact with the bumper 11 to thus complete an electrical circuit, likewise as heretofore described with that form of the invention illustrated in Figures 1 to 4, inclusive.

While but certain forms of the invention have been shown and described herein, it will be readily apparent to those skilled in the art that many minor modifications may be made without departing from the spirit of the invention or the scope of the appended claims.

What is claimed is:

1. A switch of the character described in combination with a motor vehicle body having a metallic bumper affixed to said body, an alarm carried by said body, a yieldable contact member affixed to said bumper but insulated therefrom, said member extending outwardly from said bumper and provided with a rear dependent member, and an open electrical circuit including said bumper, said yieldable member and said alarm, said circuit being closable by contact of said bumper and said yieldable member with a metallic portion of another vehicle.

2. A device as defined in claim 1 where said yieldable member includes a helical spring having a contact plate at its free end.

References Cited in the file of this patent

UNITED STATES PATENTS

| | | |
|---|---|---|
| 2,177,386 | Gearin | Oct. 24, 1939 |
| 2,259,614 | Chang | Oct. 21, 1941 |
| 2,270,687 | Morse | Jan. 20, 1942 |
| 2,482,630 | Mastromario | Sept. 20, 1949 |
| 2,592,742 | Rose | Apr. 15, 1952 |
| 2,658,967 | Matschke | Nov. 10, 1953 |